(12) United States Patent
Jacobson et al.

(10) Patent No.: US 7,785,442 B2
(45) Date of Patent: *Aug. 31, 2010

(54) METHOD AND ARRANGEMENT FOR FEEDING CHEMICALS INTO A PAPERMAKING PROCESS

(75) Inventors: Tommy Jacobson, Helsinki (FI); Gary S. Furman, St. Charles, IL (US)

(73) Assignee: Nalco Company, Naperville, IL (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/779,068

(22) Filed: Jul. 17, 2007

(65) Prior Publication Data

US 2008/0011788 A1    Jan. 17, 2008

Related U.S. Application Data

(63) Continuation-in-part of application No. 11/339,169, filed on Jan. 25, 2006, now Pat. No. 7,550,060.

(51) Int. Cl.
*D21F 11/00*    (2006.01)

(52) U.S. Cl. ............... 162/158; 162/202; 162/336; 427/361; 222/630

(58) Field of Classification Search ........... 162/158, 162/202, 209, 336, 380; 427/361; 222/630
See application file for complete search history.

(56) References Cited

U.S. PATENT DOCUMENTS

| 3,428,520 | A  | * | 2/1969  | Yiannos ............... 162/38 |
| 7,550,060 | B2 | * | 6/2009  | Jacobson et al. ........ 162/158 |
| 2004/0238455 | A1 | * | 12/2004 | Leino ................. 210/743 |
| 2007/0133346 | A1 | * | 6/2007  | Jacobson et al. ....... 366/160.2 |
| 2009/0139676 | A1 | * | 6/2009  | Todorovic et al. ...... 162/164.6 |
| 2009/0211721 | A1 | * | 8/2009  | Jacobson et al. ........ 162/232 |

* cited by examiner

*Primary Examiner*—Mark Halpern
(74) *Attorney, Agent, or Firm*—Michael B. Martin

(57) ABSTRACT

A method for feeding one or more chemicals into a papermaking process is disclosed. More specifically, a method for feeding chemistry into a thick stock of a papermaking process is disclosed.

14 Claims, 6 Drawing Sheets

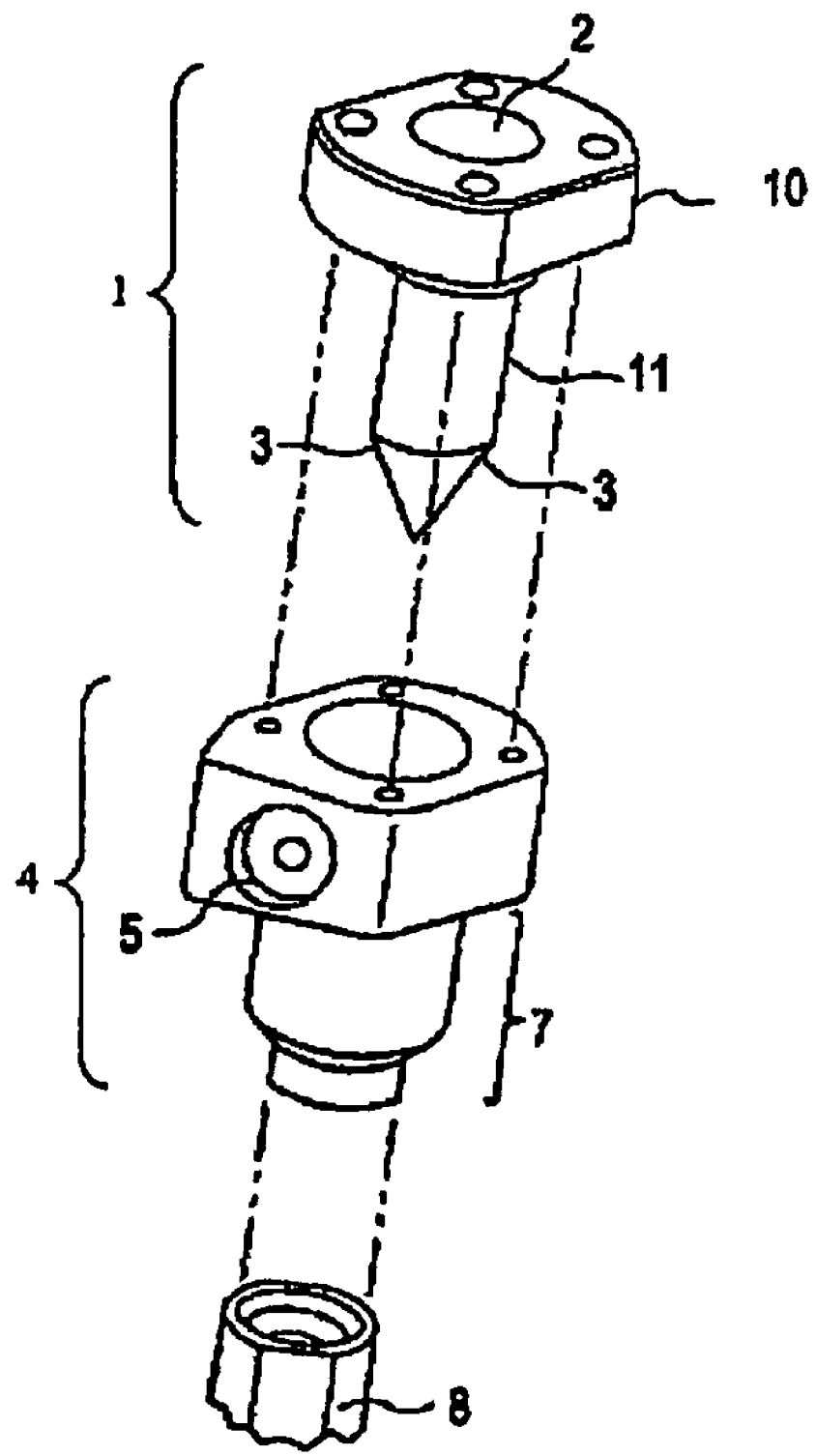

METHOD AND ARRANGEMENT FOR FEEDING CHEMICALS INTO A PAPERMAKING PROCESS

CROSS REFERENCE TO RELATED APPLICATION

This application is a continuation-in-part of U.S. Ser. No. 11/339,169, filed Jan. 25, 2006, now U.S. Pat. No. 7,550,060 which is herein incorporated by reference.

FIELD OF THE INVENTION

This disclosure relates to a method for feeding chemicals into a process stream of a papermaking process.

BACKGROUND

Various types and amounts of chemicals are added to a papermaking process. In particular, chemicals are added into a process stream of a papermaking process. The optimal feeding of these chemicals is both a quality and a cost issue in that the optimal feeding of chemicals into a process stream results in the following: a) better runnability of the paper machine; b) the quantity of the end product is more predictable and uniform; c) less web breaks and down-time of the paper machine; d) a reduction in the quantity of the chemical that needs to feed into a papermaking machine; e) smaller consumption of fresh water; and f) less energy is needed to heat fresh water.

Optimal feeding of chemicals into a process stream occurs when there is a rapid mixing of chemicals into the process stream, presence of locally stoichiometric conditions, minimized water usage in the feeding arrangement, and optimal residence/contact times of chemicals. More specifically, having locally stoichiomerric conditions means having the optimal ratio of chemicals in the process stream for the chemicals to react, and optimal residence time of the chemicals means that the chemicals should be fed into the process stream so that all the chemicals that have been fed into the system have had enough time to take effect but not too long to maintain the desired effect.

Many prior art methods and apparatuses for feeding chemicals into a process stream of a papermaking process do not result in the optimal feeding of chemicals into the process stream of a papermaking process. Therefore, a need for an apparatus and method that can optimally feed one or more chemicals into a process stream exists in the papermaking industry.

SUMMARY OF THE INVENTION

This disclosure pertains to a method for feeding one or more chemicals into a process stream of papermaking process comprising: providing one or more apparatuses comprising a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; mounting an adaptor over an opening in at least one of the following locations of papermaking process: thick stock line, between a refiner and the machine chest outlet, proximate to a basis weight valve, and between a machine chest and basis weight valve, wherein said adaptor is in communication with said outlets of said mixing chamber and is secured to said mixing chamber; running said papermaking process so that said process stream flows through said papermaking process; introducing said chemicals and a feeding liquid into said mixing chamber by introducing said chemicals or feeding liquid into said inlets of said first conduit and said second conduit; mixing said chemicals and said feeding liquid in said mixing chamber to form a mixture of said chemicals and said feeding liquid; and dispensing said mixture into said process stream in at least one of said locations through said adaptor that is in communication with said process stream.

BRIEF DESCRIPTION OF THE DRAWINGS

In the following, the method and apparatus according to the invention are disclosed in more detail with reference to the appended figures.

FIG. 5 is an exploded side elevation view of the first conduit, second conduit, mixing chamber and adaptor of one embodiment of the present invention.

DETAILED DESCRIPTION OF THE INVENTION

Figure 2:
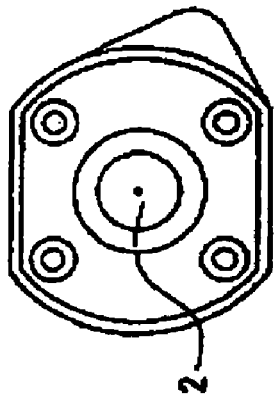
FIG. 2 is a cross-sectional view of the apparatus of FIG. 1.
Figure 4:
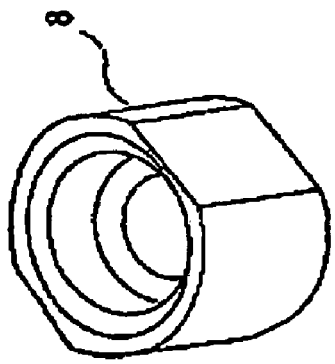
FIG. 4 is a side elevation view of the adaptor of the apparatus of FIG. 1.
Figure 1:
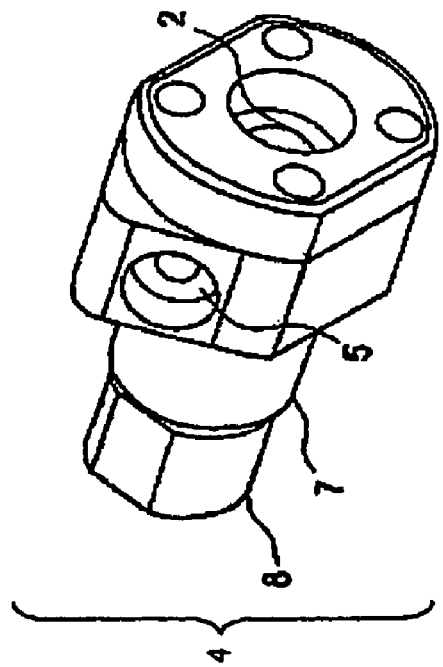
FIG. 1 is a side elevation view of an apparatus according to one embodiment of the present invention.
Figure 3:
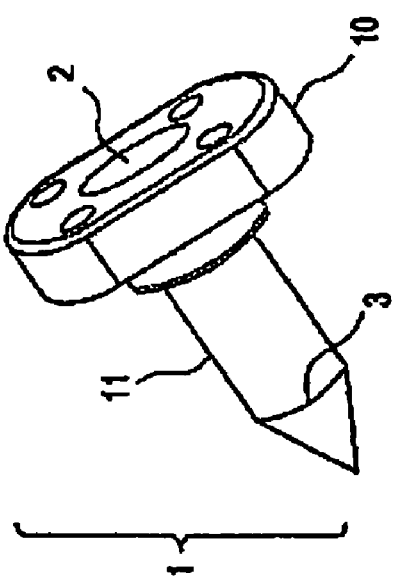
FIG. 3 is a side elevation view of the first conduit of the apparatus of FIG. 1.

"Papermaking process" means a method of making paper products from pulp comprising forming an aqueous cellulosic papermaking furnish, draining the furnish to form a sheet and drying the sheet. The steps of forming the papermaking furnish, draining, and drying may be carried out in any conventional manner generally known to those skilled in the art.

"Thick stock line" means a pipeline between a pulper or a high density storage chest and prior to a machine chest.

The apparatus of the present invention is essentially a reactor where chemical reactions can either: a) happen to activate the chemicals added to the apparatus expeditiously under controlled conditions, or b) the chemicals can be prevented from mixing with each other or other species by selecting appropriate mixing times versus chemical kinetics and shear levels. For example, the reaction rate of the chemicals that are being added to the process stream can be slowed down or even prevented by ensuring much slower chemical kinetics than the residence times inside the device.

As shown in FIGS. 1-9, the apparatus used in the present invention includes four primary components: a first conduit (1); a second conduit (4); a mixing chamber (7); and optionally an adaptor (8). The dimensions and geometries of each element of the apparatus depends upon how much chemical needs to be added to the papermaking process, as well other factors, such as the construction of the thick stock line (9) (shown in FIG. 6). The apparatus of the present invention may be made of any suitable material for handling various types of papermaking chemicals, for example, stainless steel.

As shown in FIGS. 1-9, the first conduit (1) has one or more inlets (2) and outlets (3). Preferably, the conduit has both a head portion (10) and a portion (11) that is conical in shape.

As shown in FIGS. 1-9, the second conduit (4) has one or more inlets (5) and outlets (6). The second conduit (4) secures to the first conduit's head portion (10) by any fastening means that would be appreciated by one of ordinary skill in the art, for example, the head portion (10) of the first conduit and the second conduit (4) may have one or more openings so that a screw can secure one conduit to another.

As shown in FIGS. 1-9, the mixing chamber (7) has one or more inlets (17) and outlets (18) that are in communication with the outlets of both the first conduit (1) and the second conduit (4). The mixing chamber (7) secures to the second conduit (4). The mixing chamber (7) may secure to the second conduit (4) by any fastening means that would be appreciated by one of ordinary skill in the art, for example, both the second conduit (4) and the mixing chamber (7) may have one or more openings so that a screw can secure the second conduit to the mixing chamber, or the outer surface of the mixing chamber (7) can fuse to the outer surface of the second conduit (4).

As shown in FIGS. 1-9, the adaptor (8) secures to the mixing chamber (7) and is communication with the outlets of the mixing chamber (7). The adaptor (8) may secure to the mixing chamber (7) by any fastening means that would be appreciated by one of ordinary skill in the art, for example, a portion of the mixing chamber (7) may insert into the adaptor (8).

As shown in FIGS. 1-9, the, in another embodiment, the inlets (5) of said second conduit (4) are perpendicular to said outlets of said second conduit (4).

As shown in FIGS. 1-9, the, in another embodiment, the first conduit (1) traverses said second conduit (4) perpendicular to the inlets (5) of said second conduit (4).

As shown in FIGS. 1-9, the, in another embodiment, the first conduit (1) has a head portion (10) that does not traverse said second conduit (4) and a portion that traverses said second conduit (4), wherein the portion (11) that traverses said second conduit (4) is conical in shape and wherein the point of said first conduit (1) is in communication with said mixing chamber (7).

As stated above, the present invention provides for a method of feeding one or more chemicals into a process stream. As shown in FIGS. 1-9, the, in one embodiment, the (12) adaptor (8), alone or as part of the apparatuses for feeding, is mounted over an opening (16) in the thick stock line (9) and the adaptor (8) is secured to the thick stock line (9) by any means that would be appreciated by one of ordinary skill in the alt. The feeding apparatus of the present invention, if not already done so, is connected with the adaptor. After this setup is established, one or more chemicals and a feeding liquid are introduced into the apparatus (12), mixed in the mixing chamber (7), and fed into the thick stock line (9). Those of ordinary skill in the art know many vehicles for introducing the chemicals and feeding liquid into a process stream of a thick stock line.

As shown in FIGS. 1-9, the, in another embodiment, the co-feeding of different chemicals into a process stream (13) can be achieved by the following steps: introducing several different chemicals into the apparatus (12), allowing a mixture of the different chemicals to form, and dispensing the mixture into a process stream (13); or by aligning a series of apparatuses (12) and dispensing chemicals. Chemicals may be added to the system in any order prescribed by a person of ordinary skill in the art. For example, chemicals maybe added sequentially, simultaneously or in pre-programmed order.

Figure 8:
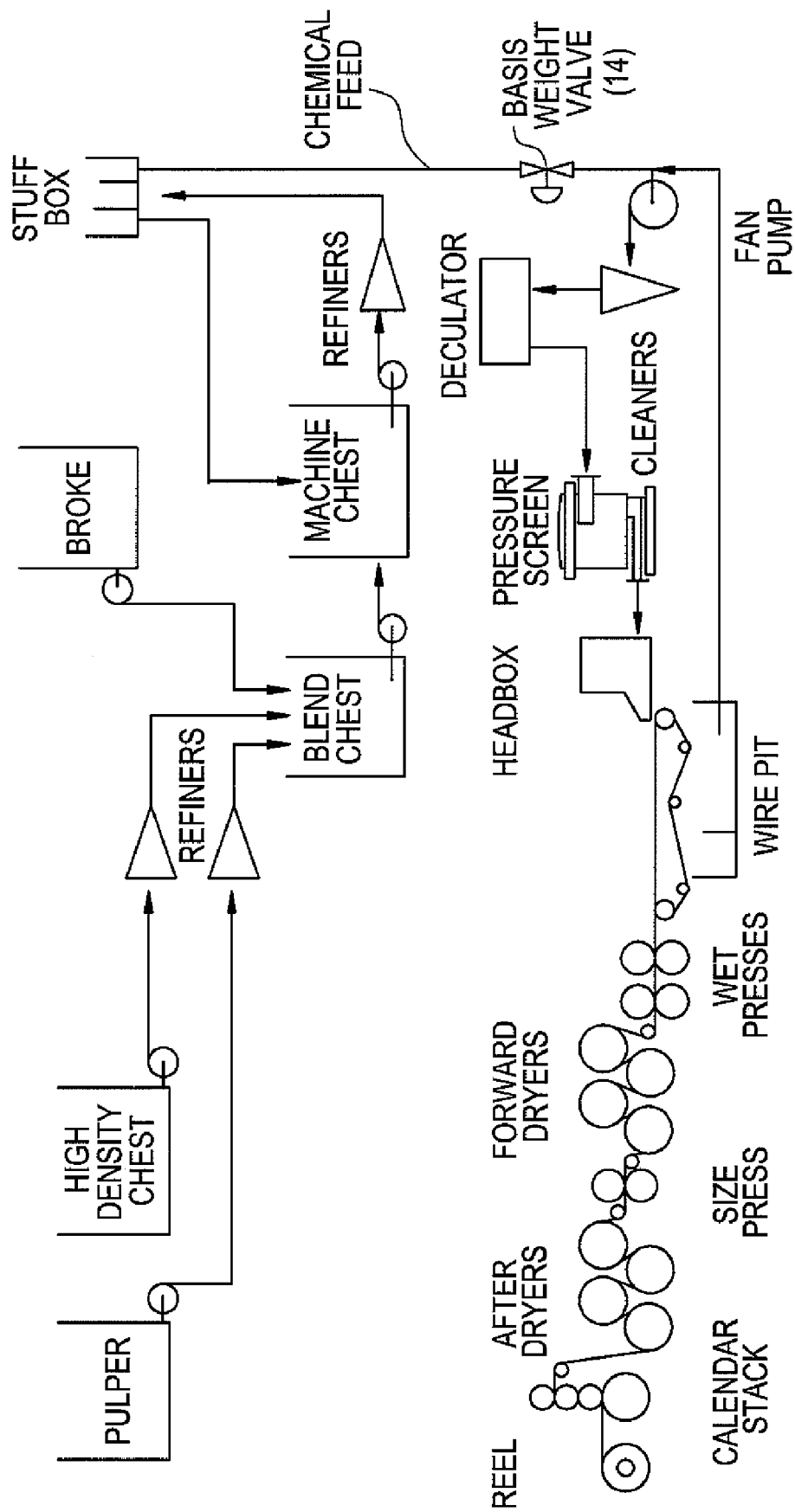
FIG. 8 illustrates a schematic drawing of a feeding arrangement prior to the basis weight valve.
Figure 9:
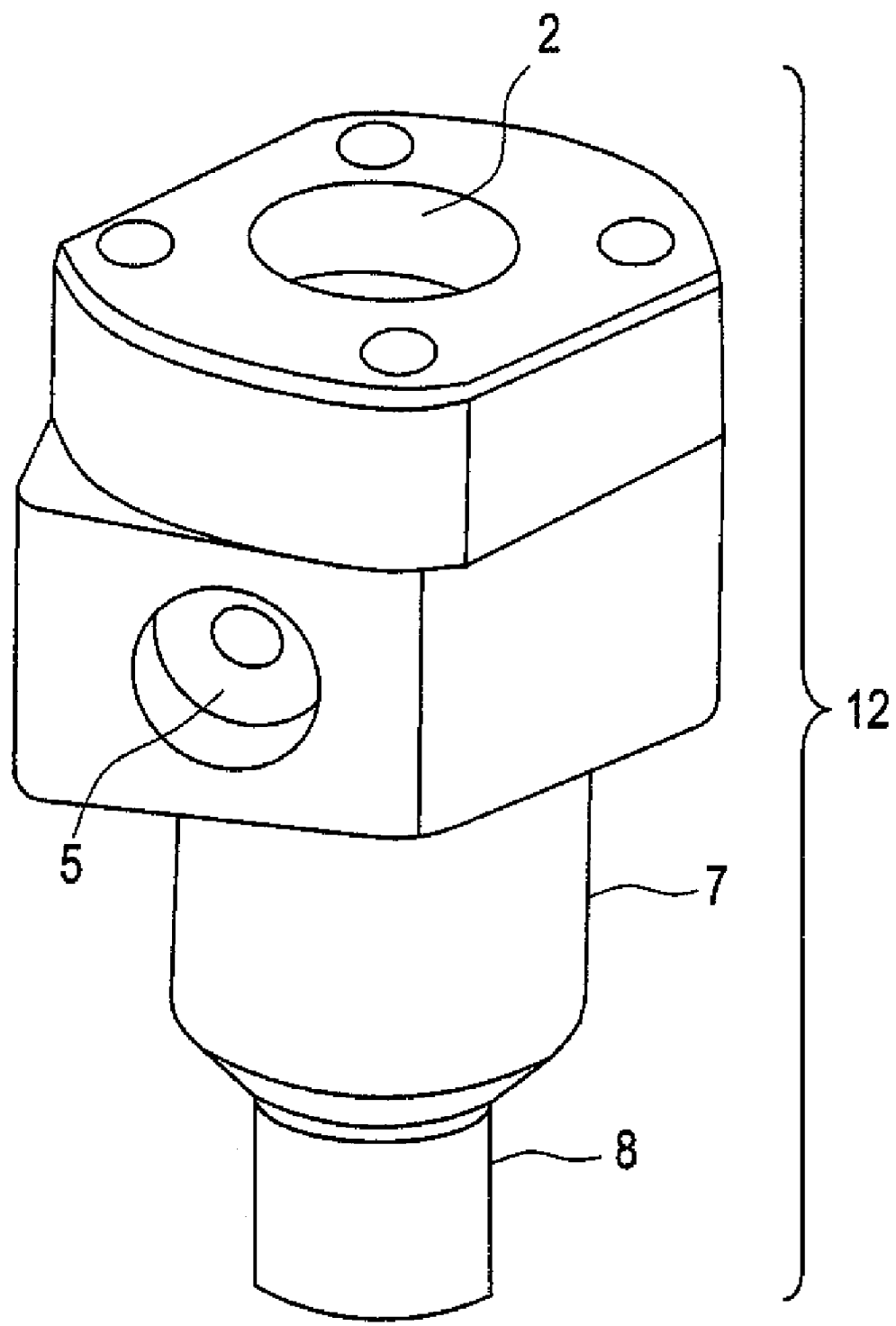
FIG. 9 is a side elevation view of an apparatus according to one embodiment of the present invention.

In another embodiment, as illustrated in FIG. 8, one or more apparatuses (12) for feeding chemicals into a process stream are positioned proximate to a basis weight valve (14) of said papermaking process. In another embodiment, the mixing is a staged mixing—mixing of chemicals prior to their introduction into the process stream. Staged mixing lasts for a time period that comports with the desired reaction rate of the chemicals fed into the mixing apparatus. In yet a further embodiment, the staged mixing lasts from about 5 microseconds to about 500 milliseconds.

In another embodiment, the activity of said chemicals is controlled by adjusting the flow rate of said chemicals and said feeding liquid, which are introduced into said apparatuses. One or more pumps that are in communication with said apparatuses may adjust the flow rate. Staged mixing can be achieved in the mixing chamber by controlling flow rates of both the chemicals and the feeding liquid into the mixing chamber.

In another embodiment, the activity of said chemicals, prior to their introduction into said process stream, is controlled by adjusting the flow rate of said chemicals and said feeding liquid, which are introduced into said mixing chamber.

In another embodiment, the chemicals are selected from the group consisting of: biocides, strength agents, brightening agents, colors, fillers, sizing agents, retention aids, drainage aids, flocculants, washing aids, defoamers, dispersing agents, nanoparticles, microparticles, fixatives, coagulants, debonders, bulking agents, softeners, lotions, emollients, anti-pitch agents, anti-stickies agents, absorbancy aids, and a combination thereof. Various chemical treatment programs employing one or more chemicals may be developed by one of ordinary skill in the art and employed by the apparatuses (12) of the claimed invention.

In another embodiment, the feeding liquid is selected from the group consisting of: fresh water; clear filtrate; whitewater; thin stock; and a combination thereof.

In another embodiment, the chemicals are diluted with a dilution liquid prior to their introduction in said first conduit (1) or said second conduit (4). In yet a further embodiment, the dilution liquid contains water.

In another embodiment, the process stream (13) contains a furnish of a papermaking process.

In another embodiment, the process stream (13) contains a thick stock of a papermaking process.

In another embodiment, the papermaking process is a tissue making process.

Figure 6:
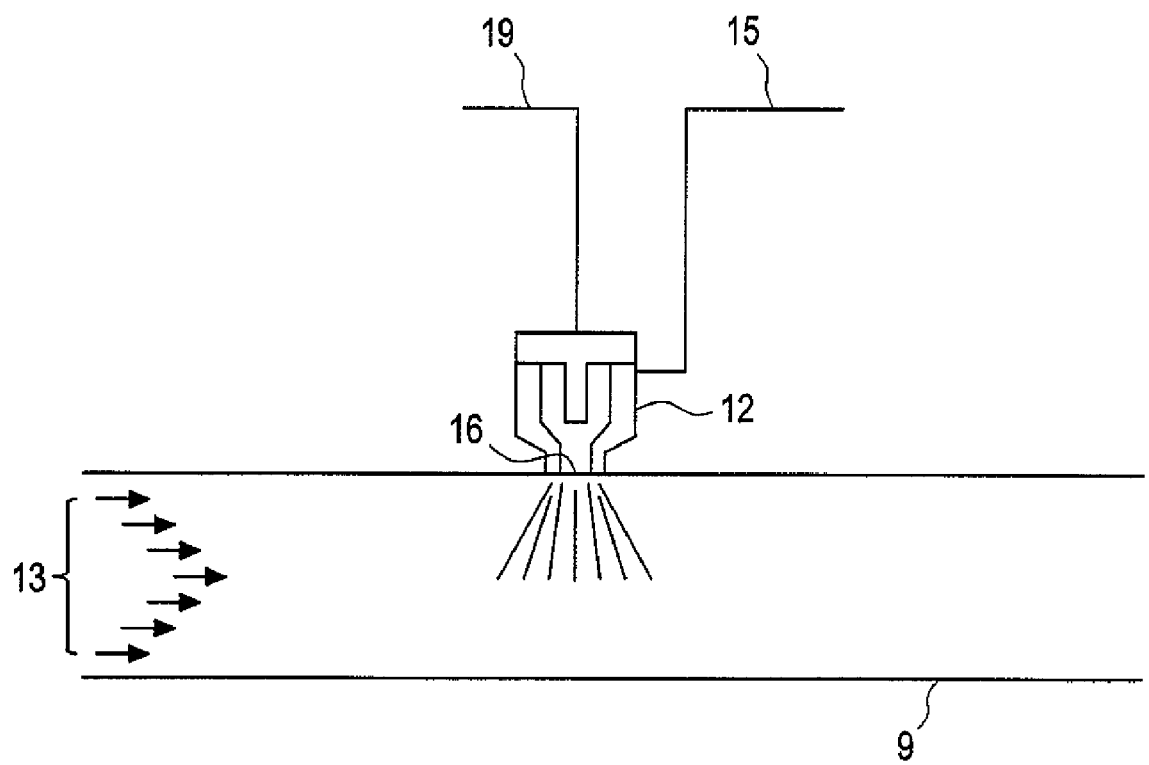
FIG. 6 illustrates a method of feeding chemical into a process stream according to one embodiment of the present invention.
Figure 7:
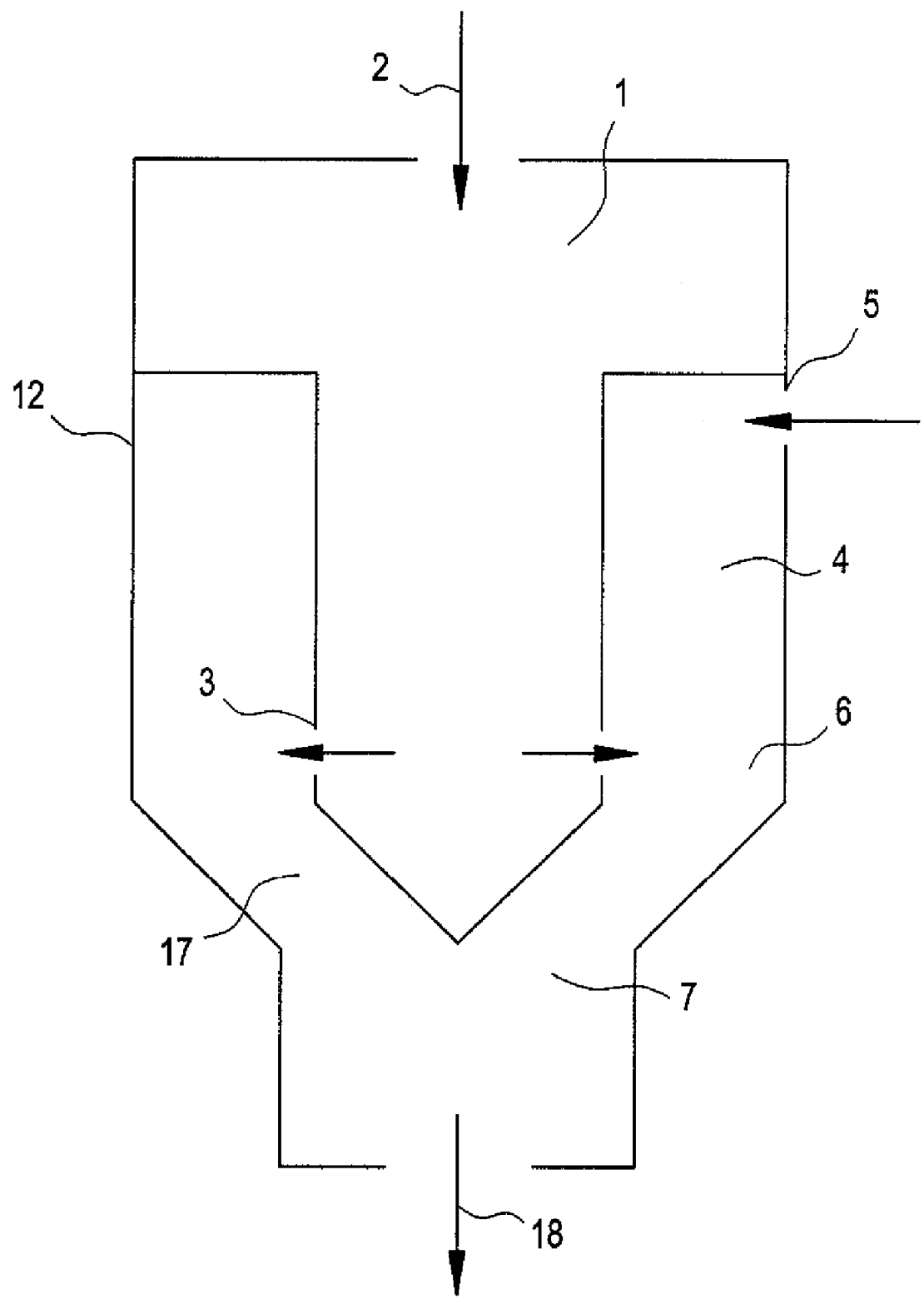
FIG. 7 represents a schematic illustration of an apparatus of the present invention.

Referring to FIGS. 6 and 7, in one embodiment, chemicals (19) are introduced into the inlet (2) of a first conduit (1). Subsequently, the chemicals flow through the conduit and out said outlets (3) of the first conduit (1) and into the inlets (17) of the mixing chamber (7). A feeding liquid (15) is also introduced into a second conduit (4). The liquid in the second conduit (4) swirls or vortexes around the first conduit (1), and exits the out the outlets (6) of the second conduit and into the mixing chamber (7) via the inlets (17) of the mixing chamber (7). The two fluids from the first conduit (1) and the second conduit (4) mix in the mixing chamber (7) and then the mixture flows through the mixing chamber (7) outlet (18), which in turn flows through the adaptor (8) that is mounted to an opening (16) in the process stream (13) and this liquid flows into the process stream (13).

We claim:

1. A method for feeding one or more chemicals into a process stream of a papermaking process comprising:

a. providing one or more apparatuses comprising a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber, b. mounting an adaptor over an opening in at least one of the following locations of the papermaking process: thick stock line, between a refiner and the machine chest outlet, proximate to a basis weight valve, and between a machine chest and basis weight valve, wherein said adaptor is in communication with said outlets of said mixing chamber and is secured to said mixing chamber;

c. running said papermaking process so that said process stream flows through at least one of the said locations of said papermaking process;

d. introducing one or more chemicals and a feeding liquid into said mixing chamber by introducing said chemicals or feeding liquid into said inlets of said first conduit and said second conduit;

e. mixing said chemicals and said feeding liquid in said mixing chamber to form a mixture of said chemicals and said feeding liquid; and f. dispensing said mixture into said process stream in at least one of said locations through said adaptor that is in communication with said process stream.

2. The method of claim 1, wherein said chemicals are diluted with a dilution liquid prior to their introduction into said first conduit or said second conduit.

3. The method of claim 1, wherein said chemicals and said feeding liquid are introduced sequentially, simultaneously or in a pre-programmed order.

4. The method of claim 1, wherein said dilution liquid is water.

5. The method of claim 1, wherein said feeding liquid is selected from the group consisting of: fresh water, clear filtrate; whitewater; a thin stock; or a combination thereof.

6. The method of claim 1, wherein said process stream contains a thick stock of a papermaking process.

7. The method of claim 1, wherein said chemicals are selected from the group consisting of: biocides, strength agents, brightening agents, colors, fillers, sizing agents, retention aids, drainage aids, flocculants, washing aids, defoamers, dispersing agents, nanoparticles, microparticles, fixatives, coagulants, debonders, bullring agents, softeners, lotions, emollients, anti-pitch agents, anti-stickies agents, absorbancy aids, and a combination thereof.

8. The method of claim 1, wherein said mixing is a staged mixing.

9. The method of claim 8, wherein said staged mixing lasts from about 5 microseconds to about 500 milliseconds.

10. The method of claim 1, wherein said process stream contains a furnish of the papermaking process.

11. The method of claim 1, wherein the activity of said chemicals is controlled by adjusting the flow rate of said chemicals and said feeding liquid, which are introduced into said mixing chamber.

12. The method of claim 1, further comprising providing one or more pumps that are in communication with said apparatuses and wherein said pumps control the flow rate of said chemicals and said diluted liquid.

13. The method of claim 1, wherein the activity of said chemicals, prior to their introduction into said process stream, is controlled by adjusting the flow rate of said chemicals and said feeding liquid, which are introduced into said mixing chamber.

14. The method of claim 1 wherein said papermaking process is a tissue making process.

* * * * *